United States Patent [19]

Atsukawa et al.

[11] 4,073,864
[45] Feb. 14, 1978

[54] METHOD OF DESULFURIZING EXHAUST EMISSION USING PULVERIZED SLAG AS ABSORBENT

[75] Inventors: Masumi Atsukawa; Hiroyuki Ushio; Haruo Kuwabara; Kyoji Kubo, all of Hiroshima, Japan

[73] Assignee: Mitsubishi Jukogyo Kabushiki Kaisha, Tokyo, Japan

[21] Appl. No.: 661,499

[22] Filed: Feb. 26, 1976

Related U.S. Application Data

[63] Continuation-in-part of Ser. No. 577,404, May 14, 1975, abandoned, which is a continuation of Ser. No. 308,434, Nov. 21, 1972, abandoned.

[30] Foreign Application Priority Data

Nov. 21, 1971  Japan .................................. 46-93978

[51] Int. Cl.$^2$ .......................... C01B 17/00; C01F 1/00
[52] U.S. Cl. ...................................... 423/242; 423/166
[58] Field of Search ....................... 423/242, 244, 166

[56] References Cited

U.S. PATENT DOCUMENTS

| 3,547,583 | 12/1970 | Wilson | 423/242 |
| 3,720,754 | 3/1973 | Wilson | 423/244 |
| 3,906,079 | 9/1975 | Tonaki et al. | 423/242 |

*Primary Examiner*—O. R. Vertiz
*Assistant Examiner*—Gregory A. Heller
*Attorney, Agent, or Firm*—Toren, McGeady and Stanger

[57] ABSTRACT

A method of desulfurizing exhaust emissions which comprises pulverizing slag from a blast furnace, converter, open-hearth furnace or the like which is composed principally of $Ca_2Al_2SiO_7$, suspending the resulting minute particles in water, and bringing the aqueous suspension of pulverized slag into contact with the exhaust that contains sulfur dioxide and oxygen, while supplying the slag at a rate to keep the pH of the suspension within a range of 1.5 to 4.0 and thereby to remove the sulfur dioxide from the exhaust.

1 Claim, 1 Drawing Figure

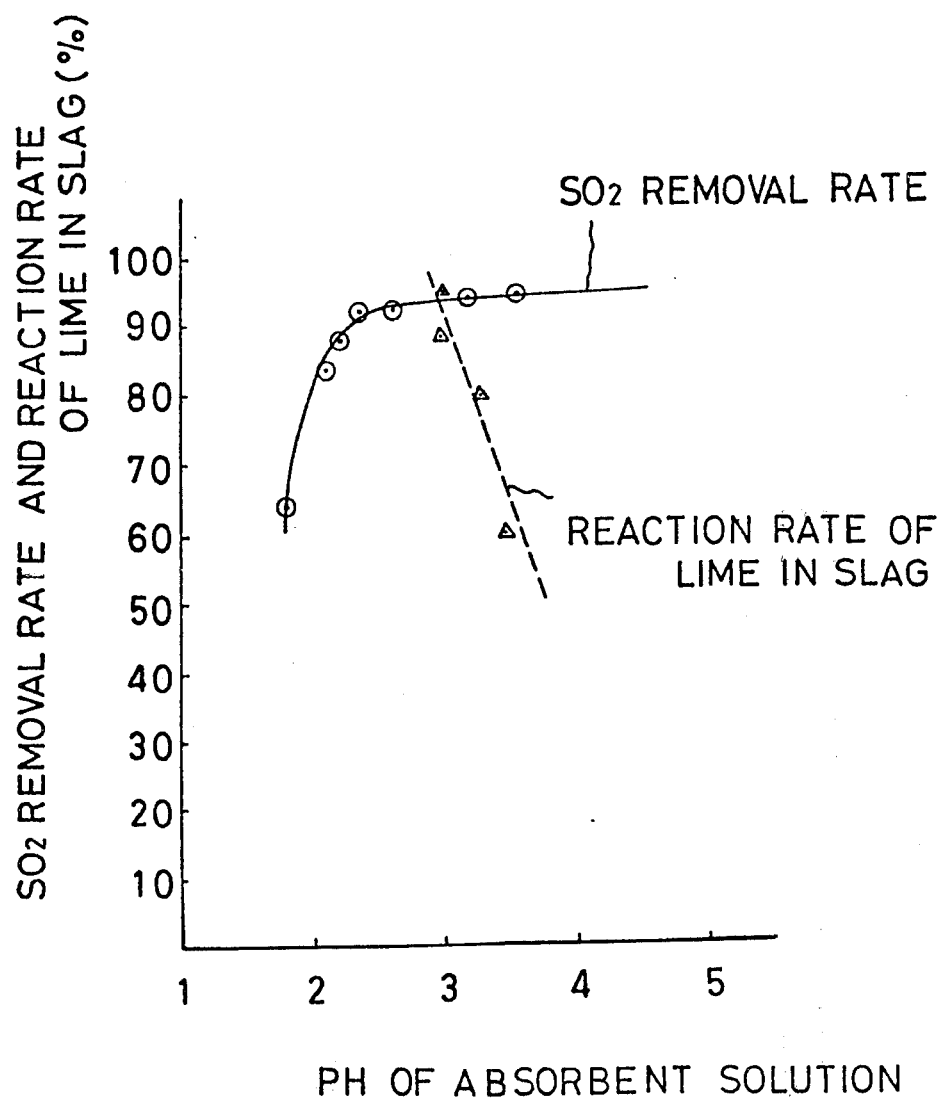

METHOD OF DESULFURIZING EXHAUST EMISSION USING PULVERIZED SLAG AS ABSORBENT

CROSS-REFERENCE TO RELATED APPLICATIONS

This application is a continuation-in-part of copending application Ser. No. 577,404, filed on May 14, 1975, now abandoned which, in turn, is a continuation of application Ser. No. 308,434, filed Nov. 21, 1972, now abandoned.

BACKGROUND OF THE INVENTION

1. Field of the Invention

This invention relates to a method of removing sulfur dioxide from sulfur dioxide-containing gas using as the absorbent, a slurry solution prepared by suspending in water minute particles of slags from furnaces, such as, blast furnaces, converters and open-hearth furnaces.

2. Description of the Prior Art

Generally, the slags from blast and open-hearth furnaces and converters are only partially utilized in the manufacture of cement, bricks, heat-resisting materials and the like. The greater part goes into reclamation work as ballast. These slags are formed when iron ore is heated to upwards of 1000° C so that the impurities therein combine with lime and other additives in the molten state to form double salts. An X-ray analysis of blast furnace slag revealed the presence of $Ca_2Al_2SiO_7$ as the principal component. This double salt is stable at normal temperature and is difficult to dissolve or dissociate in water. Table I shows a typical composition of blast furnace slag, indicating a calcium content of about 40% in terms of CaO. However, as noted, these materials are present primarily as the double salt.

Table 1

| Component | Percentage (wt %) |
|---|---|
| $SiO_2$ | 33.7 |
| $Fe_2O_3$ | 2.7 |
| $Al_2O_3$ | 15.9 |
| $TiO_2$ | 1.4 |
| MnO | 0.4 |
| CaO | 39.9 |
| MgO | 3.7 |
| Others | Remainder |
| Total | 100.0 |

It is, of course, well known to use CaO as a principal reactant in the purification of $SO_2$-containing gases and to produce gypsum as a by-product of this process. Typically, this process involves the steps of crushing the CaO, suspending the resulting powder in water, and circulating the suspension at a pH of 6 to 7 in an absorbing tower in contact with the gas to thus absorb the $SO_2$. The reactions for this process are as follows:

$$SO_2(g) \rightleftarrows SO_2(l) \tag{1}$$

$$SO_2(l) + H_2O \rightleftarrows H_2SO_3 \tag{2}$$

$$Ca(OH)_2 + H_2SO_3 \rightarrow CaSO_3 + 2H_2O \tag{3}$$

After dissolution in the water, the sulfur dioxide is hydrolyzed to produce $H_2SO_3$ (equation 2). This then reacts with the $Ca(OH)_2$ in the water to produce $CaSO_3$.

It should be noted that the calcium hydroxide is in solution in this process and thus is dissociated as follows:

$$Ca(OH)_2 \rightleftarrows Ca^+ + 2OH^- \tag{4}$$

Consequently, the solution is alkaline. However, the double salts from which the above mentioned slags are formed do not ionize in water or in $H_2SO_3$ solution and consequently do not form the hydroxyl ion. Thus, these slags have not been used for $SO_2$ removal processes since they do not provide a good absorbent for $SO_2$.

SUMMARY OF THE INVENTION

The method of the invention is directed to utilization of the calcium contained in slags composed primarily of such double salts, and consists of pulverizing slag into minute particles, suspending them in water, and washing effluent sulfur dioxide-containing gas which also contains oxygen gas with the aqueous suspension or slurry solution as an absorbent, wherein the slag is supplied at a rate to maintain the pH of the slurry in the range from 1.5 to 4.0, thereby removing the sulfur dioxide from the gas. The absorbent solution once used for the desulfurization is filtered to recover useful gypseous by-product as materials for the manufacture of cement and plaster boards.

The present invention is thus advantageous in that it enables slags which are stable at normal temperature and insoluble in water to be utilized as a quite satisfactory desulfurizing agent, involves an extremely simplified process, and requires for its practice, equipment available at very lost cost.

BRIEF DESCRIPTION OF THE DRAWINGS

The FIGURE is a graph of the variation in $SO_2$ removal with the pH of the absorbing solution.

DESCRIPTION OF THE PREFERRED EMBODIMENT

In order to clarify the elements that constitute the present invention, the method of the present invention will be compared with the above outlined known method of recovering gypsum using lime as an absorbent. In the known lime process, it is important to attain an enhanced sulfur dioxide removal rate and also a sufficiently high solid reaction rate so that no unreacted lime remains. It is desirable, however, that if the sulfur dioxide removal rate is to be increased, the pH of the absorbent solution be relatively high, whereas for the high solid reaction rate, the pH be relatively low. Resolution of this conflict is a problem. As a solution to this, it has been the practice to use an absorbent solution of pH 6 or more for the gas to be desulfurized having a relatively low sulfur dioxide concentration, bring the absorbent solution into contact with another gas source having a high sulfur dioxide concentration, reduce the pH value of the absorbent solution to 4.5 or less, and thereby allow the unreacted lime in the absorbent solution to undergo the reaction. An alternate method is to add sulfuric acid to an absorbent solution that contains unreacted lime and thereby conclude the reaction.

The absorbent solution, containing as the principal ingredient calcium sulfite obtained in the course of absorption, is sent to an oxidizer, where the solution is oxidized with air under pressure for the recovery of gypsum.

It should be further noted that the concentration of the $SO_2$ in the exhaust gas is a factor in determining the speed of the absorption. On the other hand, as the concentration of $SO_2$ in the liquid is increased, the pH of the solution is lowered and, accordingly, the efficiency of the absorption of $SO_2$ is also lowered. Conventionally, burnt exhaust gas contains from about 500 – 1,000 ppm of $SO_2$, and an effectively run gas treating plant must remove at least 90% of this $SO_2$. Consequently, the concentration of $SO_2$ at the outlet of the plant should be 100 ppm or less.

On the other hand, in accordance with the present invention, the pH value of the absorbent solution prepared by suspending pulverized slag in water is kept within the range from 1.5 to 4, preferably from 2 to 3.5, for the washing of effluent sulfur dioxide-containing gas, and in this way the problem of the lime process is solved. Thus, both the sulfur dioxide removal rate and lime solid reaction rate are kept at high levels within the same scrubber. Also, because the calcium content of the slag is converted into gypsum in the course of the absorption process, the oxidizer, which is indispensible for the ordinary lime process, is not needed. The method of the invention is thus economically advantageous in that it involves a much more simplified process as compared with the known lime process and accordingly requires less costly equipment, and that it utilizes iron foundry wastes as the absorbent.

When dissolving $SO_2$ in water, the equilibrated concentration of $SO_2$ in the gas is about 1,000 ppm in water at a pH of about 4. Consequently, it would appear to be extremely difficult to remove $SO_2$ from such a solution. However, because in the presently claimed process the $H_2SO_3$ ion which is absorbed, is converted to $H_2SO_4$ due to the oxygen in the exhaust gas which does not have a partial pressure of $SO_2$ above it in the gas, the reaction is driven to the right so that additional $SO_2$ gas can be removed at relatively low pH values and wherein the overall concentration of $SO_2$ in the liquid is relatively low.

Thus, in the present process, the sulfite ion which is present in the liquid, is oxidized in part by the oxygen in the exhaust gas to produce sulfuric acid. This stronger acid serves to dissolve out the alkaline materials in the slag. Moreover, the oxidation of the $H_2SO_3$ in the liquid is promoted by the silicon and aluminum which are dissolved out from the slag and which act as catalysts to convert additional $H_2SO_3$ to $H_2SO_4$. This, in turn, results in the greater part of the sulfuric acid ion reacting with the calcium ion to produce gypsum.

The single FIGURE is a graphical representation of data illustrating the relations between the pH value of the slag used in the present invention and the $SO_2$ removal rate and the reaction rate of lime in the slag.

More particularly, when sulfur dioxide-containing gas is washed with an absorbent solution prepared by suspending pulverized slag in water, $SO_2$ and $SO_3$ first dissolve in water to form, respectively, sulfurous acid and sulfuric acid, as expressed by the formulas (5) through (9).

  (5)

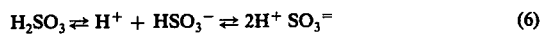  (6)

  (7)

  (8)

Part of the sulfurous acid is oxidized by oxygen in the effluent gas to sulfuric acid as given by the formula (9).

  (9)

Next, the chief ingredient of the slag, namely, the $Ca_2Al_2SiO_7$, reacts with the sulfuric acid and thereby the double salt is dissociated and the calcium content of the slag is converted into gypsum in accordance with the reactions (10) and (11).

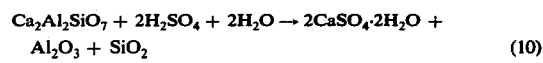  (10)

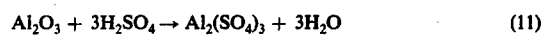  (11)

Most of the minor ingredients of the slag dissolve out in the form of sulfates. For example, the magnesium content comes out as expressed by the formula (12).

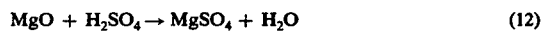  (12)

As described above, this type of slag is, in essence, stable and poorly reactive, but it readily reacts with the dilute sulfuric acid formed by the dissolution of sulfur dioxide in the effluent gas. The formation of dilute sulfuric acid reduces the pH of the absorbent solution, and the low pH makes it more difficult for the sulfur dioxide to dissolve in the absorbent solution, with a consequent drop in the desulfurization rate. However, in the present invention, the alumina and silica in the slag produce beneficial effects since they promote the oxidizing reaction of sulfurous acid in the absorbent solution to form sulfuric acid.

As a result of this reaction, the sulfur dioxide dissolved in the absorbent solution is immediately oxidized to sulfuric acid, which in turn reacts with the slag to form the sulfates of calcium, aluminum, etc. This means that there is a continual removal, i.e., conversion, of the $SO_2$ in the solution which promotes the additional dissolution of $SO_2$ into the absorbent slurry.

Thus, even with a low pH value, the desulfurization rate does not decline, as is the case with the lime process, while, at the same time, the dissociation reaction of the slag proceeds, thereby making it possible to maintain a high reaction rate of the lime in the slag. Experiments showing the relation between the pH of the absorbent solution and the $SO_2$ removal rate and the reaction rate of lime in the slag are graphically represented in the FIGURE. As can be seen from the graph, the $SO_2$ removal rate plummets down if the pH is too low and, conversely, if the pH is too high, the reactivity of the slag drops steeply. It will be appreciated, therefore, that, in order to maintain a $SO_2$ removal rate of over 80% and a lime reaction rate of over 60%, it is necessary to keep the pH within the range of 1.5 to 4. The optimum pH value varies with the sulfur dioxide and oxygen concentrations of the effluent gas to be freed of the sulfur dioxide, the type and operating conditions of the scrubber, and other factors, and because the higher pH value is sometimes economically beneficial for the selection of the material even at some sacrifice of the slag utilization rate.

In the present invention, the particle size of the slag should be controlled so as to be no greater than about 200 microns. With such reaction conditions, it is possible to obtain a reaction product containing more than about 60% by weight of gypsum. The present invention is illustrated by the following non-limitative example.

EXAMPLE

Treatment of 2000 Nm$^3$/h of exhaust gas from a small oil-burning boiler in accordance with the method of this invention gave the following results:

| Exhaust gas composition before the treatment (vol. %) | | | | |
| --- | --- | --- | --- | --- |
| SO$_2$ | O$_2$ | CO$_2$ | H$_2$O | N$_2$ |
| 0.07 | 10 | 7 | 8 | remainder |

The exhaust gas at 220° C was water washed in a spray column, humidified and cooled down to 55° C, sent to a scrubber of the packed tower type, where it was washed with water containing 6 wt. % of blast furnace slag of the composition given in Table 1 with an average particle size of 60 μ. The slag supply was controlled so that the pH of the absorbent solution in the constant state was maintained at 3. The absorbent solution taken out of the scrubber was filtered and a cake of the composition shown in Table 2 was obtained. The water content of the cake was 25% and the rate of SO$_2$ removal from the exhaust gas was 90%.

Table 2.

| Component | Percentage (wt %) |
| --- | --- |
| CaSO$_4$ · 2H$_2$O | 67.2 |
| CaO | 2.8 |
| SiO$_2$ | 15.8 |
| Al$_2$O$_3$ | 7.2 |
| MgO | 0.5 |
| Fe$_2$O$_3$ | 1.5 |
| Others | 5.0 |
| Total | 100.0 |

What is claimed is:

1. A method for desulfurizing sulfur dioxide-containing exhaust gases containing oxygen which comprises pulverizing slag from a blast furnace, converter or open hearth furnace, said slag being principally composed of Ca$_2$Al$_2$SiO$_7$, suspending the resulting minute particles in water, contacting the aqueous suspension with the exhaust gases while supplying the slag at a rate to maintain the pH of the suspension within the range of 1.5 to 4.0 to thereby remove the sulfur dioxide from the exhaust and then filtering the thus contacted suspension to recover the gypsum product from the slag formed by the absorption of the sulfur dioxide.

* * * * *

UNITED STATES PATENT OFFICE
CERTIFICATE OF CORRECTION

Patent No. 4,073,864      Dated February 14, 1978

Inventor(s) Masumi Atsukawa et al

It is certified that error appears in the above-identified patent and that said Letters Patent are hereby corrected as shown below:

In the heading of the patent [30] should read as follows:

--[30] Foreign Application Priority Data

November 22, 1971    Japan....... 46-93978

Signed and Sealed this

Sixteenth Day of May 1978

[SEAL]

Attest:

RUTH C. MASON      LUTRELLE F. PARKER
Attesting Officer      Acting Commissioner of Patents and Trademarks